United States Patent [19]
Davis

[11] Patent Number: 5,563,487
[45] Date of Patent: Oct. 8, 1996

[54] CONTROL CIRCUIT FOR AN INDUCTIVE LOAD

[75] Inventor: Rex M. Davis, Loughborough, United Kingdom

[73] Assignee: Switched Reluctance Drives, Ltd., Leeds, United Kingdom

[21] Appl. No.: 426,158

[22] Filed: Apr. 21, 1995

[30] Foreign Application Priority Data

Apr. 22, 1994 [GB] United Kingdom ............... 9408056

[51] Int. Cl.$^6$ ............... H02P 7/05; H02K 19/06
[52] U.S. Cl. ............... 318/701; 318/254
[58] Field of Search ............... 318/138, 254, 318/439, 685, 696, 701

[56] References Cited

U.S. PATENT DOCUMENTS

| | | | |
|---|---|---|---|
| 3,679,953 | 7/1972 | Bedford | 318/138 |
| 4,348,619 | 9/1982 | Ray et al. | 318/139 |
| 5,010,267 | 4/1991 | Lipo et al. | 310/162 |
| 5,115,181 | 5/1992 | Sood | 318/701 |

FOREIGN PATENT DOCUMENTS

| | | | |
|---|---|---|---|
| 0506408A2 | 9/1992 | European Pat. Off. | H02P 7/00 |
| WO90/00832 | 1/1990 | WIPO | H02P 7/00 |

OTHER PUBLICATIONS

Stephenson and Blake, "*The Characteristics, Design and Applications of Switched Reluctance Motors and Drives,*" (Jun. 1993, Nurenberg, Germany).

Primary Examiner—Bentsu Ro
Attorney, Agent, or Firm—Arnold, White & Durkee

[57] ABSTRACT

A control circuit for an inductive load, such as a phase winding of a reluctance motor, includes a boost flyback converter. The controller includes a dc link capacitor switchable across the load by means of a control switch and a suppressor switch for controlling the application of rectified current to the dc link capacitor. The suppressor switch is operated independently of the control switch in order to control the rectified current so that it follows the sinusoidal input voltage waveform. By this technique, the harmonics generated by switching the rectified input current are substantially suppressed.

18 Claims, 4 Drawing Sheets

5,563,487

CONTROL CIRCUIT FOR AN INDUCTIVE LOAD

FIELD OF THE INVENTION

This invention relates to control circuits for inductive electrical loads, The invention is particularly applicable to a drive for a switched reluctance motor which derives unidirectional current pulses from an alternating current supply.

BACKGROUND OF THE INVENTION

A typical control circuit for an inductive electrical load, such as an electric motor, will derive power from a single phase mains supply, making use of a diode bridge rectifier and a smoothing capacitor to derive a direct voltage. Capacitively smoothed rectifiers are well known for their high harmonic content, both in relative amplitude and the extent of the harmonics, of the current drawn from the mains supply.

The switched reluctance motor is operable with unidirectional, but pulsating, motor winding currents which are controlled by a power converter which uses semi-conductor switches in known controls. The currents continue to flow, usually only briefly, through diodes in the conventional converter after a switch has ceased to conduct. When a winding current is carried solely by the diodes at least a proportion of the energy in the winding is returned to a smoothing capacitor. The smoothing capacitor serves two main purposes: firstly to accept the energy returned from the motor windings and secondly to provide a relatively smooth direct voltage supply, derived from the single phase alternating current mains supply, for the power converter circuit which provides and controls the pulsating current supplied to the motor windings.

Legislation is being introduced which is designed to set limits on the amplitudes of the currents drawn at other than the fundamental, e.g. mains, frequency. This restricts the power which can be taken from the main supply by a capacitively smoothed diode bridge rectifier arrangement. When the converter power rating is likely to exceed the set limit, additional components are required in the converter circuitry between the mains supply and the smoothing capacitor in order to keep the amplitudes of currents, at frequencies above the fundamental frequency, within any limits laid down.

SUMMARY OF THE INVENTION

According to one embodiment of the invention there is provided a control system for an inductive load, the system comprising first and second alternating current (ac) input terminals; current pulse control means, operable to control the current in the inductive load, having a pair of power terminals and a control terminal, one of the power terminals being connectable to one end of the inductive load; capacitor means connected to the other power terminal; rectifier means operably connected with the ac input terminals and arranged to provide a charging current to the capacitor means, the rectifier means including an energy storage inductor and suppressor switch means operable to boost the voltage across the capacitor to a value which exceeds the peak voltage between the ac input terminals to control the current in the inductor according to its frequency of switching and its switching duty cycle to maintain the boosted voltage applied to the capacitor means and to suppress the higher harmonic current components drawn at the (ac) input terminals.

The invention may also be considered as a current control system for an inductive load, the system comprising first and second alternating current (ac) input terminals; pulse control means having an input and an output, which output is connectable to one end of the inductive load and which is operable to control the current in the inductive load; voltage boosting means connected with the input to the pulse control means and arranged to boost the voltage between the ac input terminals, the voltage boosting means including capacitance means for storing the boosted voltage, an inductor arranged to carry the current from the ac input terminals and suppressor switch means operable to control the current in the inductor according to its frequency of switching and its switching duty cycle to maintain the boosted voltage applied to the pulse control means and to suppress harmonics of ac supply current.

Thus, a control circuit for an inductive load may include a first semiconductor switching device (SSD), operating at a first load control frequency and drawing power from unipolarity capacitor means, and a second SSD operating at a second, relatively higher, frequency and with a predetermined duty cycle sequence and controlling current in an energy storage inductor either in series with an ac terminal of single phase rectifier means or in series with a dc terminal thereof, whereby when the second SSD conducts, current in the energy storage inductor increases, and, when non-conducting, a proportion of the energy in the said inductor is transferred via diode means to the capacitor means to replace the power drawn therefrom by the load control circuit, the power for the rectifier means being drawn from a single-phase ac supply from which the ac current drawn from the ac supply and controlled by the second SSD is made to track approximately a sinusoidal waveform at the frequency of the ac supply by modulating the said duty cycle sequence during each half cycle of the ac supply.

Preferably, the frequency of switching of the suppressor switch means or the said second SSD is between 5 kHz and 100 kHz, for example between 10 kHZ and 50 kHz or 10 kHz and 20kHz. It could be lower than 5 kHz (eg. 1 khz) for certain applications. Preferably, the capacitance means are one or more unipolarity capacitors.

According to one form of the invention there is provided a current control circuit for an inductive load comprising: first and second alternating current (ac) input terminals; a rectifier arranged to receive a current from the input terminals and to provide a rectified output; load current control means having a pair of power terminals and a control terminal, one power terminal thereof being connectable with one end of the inductive load; suppressor switch means having a pair of power terminals and a control terminal, one power terminal thereof being connectable with the other end of the inductive load, and a capacitor connected between the other power terminals of the current control means and the suppressor switch means; an inductor connected in the path between the first ac input terminal and the other end of the inductive load; a first recirculating diode connected to conduct from the other end of the inductive load to the other power terminal of the current control means; and a second recirculating diode connected to conduct the other power terminal of the switch means to the one end of the inductive load.

A plurality of inductive loads may share a connection with the rectified output of the rectifier, each inductive load having current control means, the other power terminal of each being connected with the capacitance means and each having a second recirculating diode connected to conduct from the other power terminal of the suppressor switch means to a respective one end of its associated inductive load.

The current control circuit may use semiconductor switching devices (SSD's) for the load current control means for the or each inductive load whereby the frequency, timing and duration of a modulated unidirectional current in the or each load is controlled by an individual SSD. The said unidirectional currents may be provided by a unipolarity capacitor which receives its power under the control of a common suppression SSD from a single phase ac voltage source via a diode bridge rectifier and an energy storage inductor and in which the common SSD switches with a higher frequency than the individual control SSDs and with a duty cycle which varies during each half-cycle of the ac supply so as to modulate the ac supply current to be approximately sinusoidal at the ac supply frequency but containing a small ripple component of current at the said higher frequency. The individual control SSDs are connected between one end of the capacitor and one end of the or each load and the other end(s) of the loads is/are connected to the common SSD whose other terminal is connected to the other end of the capacitor and in which the other end of the or each load is connected via a diode to the one end of the capacitor and the one end of the or each load is individually connected via diode to the other end of the capacitor and in which the switching of the common SSD alternately charges the said energy storage inductor from the ac supply when the common SSD is ON and allows it to discharge into the capacitor when the common SSD is OFF so that the capacitor is maintained charged to a direct voltage which exceeds the peak value of the ac supply voltage.

According to another form, the invention provides a current control circuit for at least two inductive loads having a common connection between them, the circuit comprising: a rectifier, having first and second alternating current (ac) input terminals and first and second direct current (dc) output terminals; an energy storage inductor connected with the first ac input terminal; suppressor switch means connected across the output terminals of the rectifier; first and second serially connected capacitors having terminals commonly connected, at respective one ends with the second ac input terminal; a first boost diode connected to conduct from the first dc output terminal to the other end of the first capacitor; a second boost diode connected to conduct from the other end of the second capacitor to the second dc output terminal; first current control means, having first and second power terminals and a control terminal, the first power terminal being connected with the other end of the first capacitor and the second power terminal being connectable to one of the inductive loads; second current control means, having first and second power terminals and a control terminal, the first power terminal being connectable with the other of the inductive loads and the second power terminal being connected with the other end of the second capacitor; a first recirculating diode connected to conduct from the other inductive load and the first capacitor; and a second recirculating diode connected to conduct from the second capacitor to the one inductive load, the suppressor switch means being operable to control the current in the energy storage inductor according to its frequency of switching and its switching duty cycle to maintain the rectified voltage applied to the capacitors and to suppress the harmonic current components drawn at the ac input terminals.

In an alternative to this form of the invention the boost diodes can be respectively connected with the first ac input terminal instead.

In both of these forms the invention employs a novel form of boost converter used to reduce the harmonic content of the single phase ac supply current drawn by e.g. a bridge rectifier. In the particular form, two series connected unipolarity capacitors define a common mid-point which is the negative terminal of one and the positive terminal of the other. The said mid-point is connected to one ac terminal of the bridge rectifier and to one ac supply terminal, usually the 'neutral', and the positive terminal of the bridge rectifier, (or the other ac bridge rectifier terminal) is connected via a diode to the positive terminal of said one of the two capacitors and the negative terminal of the bridge rectifier (or the said other ac bridge rectifier terminal) is connected via a diode to the negative terminal of the said other of the capacitors. The energy storage inductor is connected between the other ac supply terminal, usually the 'line', and the said other ac bridge rectifier terminal, semiconductor switching device (SSD) is connected across the dc terminals of the bridge rectifier so that, when it conducts, current in the inductor increases and when it is non-conducting the inductor releases energy to the two capacitors alternately, charging the one capacitor when the said other ac supply terminal is positive with respect to the said one ac supply terminal, and charging the other capacitor when the said other ac supply terminal is negative with respect to the said one ac supply terminal. The SSD switches at a frequency of at least 100 times the frequency of the ac supply and with a duty cycle which is modulated during each half cycle of the ac supply so as to reduce the harmonic content of the current drawn from the ac supply and simultaneously to maintain a voltage across each capacitor at a value which exceeds the peak value of the ac supply voltage in spite of the fact that the load current drawn from the positive terminal of the first capacitor and returned to the said mid-point may differ from the load current drawn from the mid-point and returned to the negative terminal of the other capacitor.

In a variant on this form of the invention, the energy storage inductor (s), can take the form of two windings on the same magnetic core or two windings each on its own magnetic core, in which the position of the first said winding is in series between the positive dc terminal of the bridge rectifier and one terminal of the semiconductor switching device (SSD) and a diode is connected between the common point between the SSD and the end of the first winding connected to it and the positive terminal of one capacitor. The position of the second said winding is in series between the negative dc terminal of the bridge rectifier and the other terminal of the SSD, and a diode is connected between the common point between the SSD and the end of the second winding connected to it, and the negative terminal of the other capacitor.

This form of the invention and its variants are particularly applicable to loads which take the form of an even number of windings of a switched reluctance motor where one end of each winding is connected to the mid- point between the two series capacitors, and the remote end of each alternate winding is connected via an SSD to the positive terminal of one capacitor and via a diode to the negative terminal of the other capacitor, and the remote end of each remaining winding is connected via an SSD to the negative terminal of the other capacitor and via a diode to the positive terminal of the one capacitor.

The invention also extends to a method of operating a control system or circuit according to the invention in which an ac supply is applied to the ac input terminals, the pulse control means are actuated in accordance with the demand imposed by the load(s) and the suppressor switch means are switched to control the current in the inductor by its duty cycle and its switching at a higher frequency than the output from the pulse control means, so as to maintain the boosted voltage on the capacitors and to suppress harmonics of the ac supply current.

Also according to the invention there is provided a method of suppressing harmonics in the control of a switched inductive load supplied from a rectified alternating current (ac) source, the method comprising: a) supplying the load from a charged smoothing capacitor; b) controlling the application of source voltage to the capacitor by actuating a suppressor switch; c) comparing the ac source current waveform with a reference waveform; d) switching the suppressor switch to maintain the ac source current waveform substantially in conformity with the reference waveform.

Preferably, the duty cycle of the suppressor switch is varied according to a sequence which repeats every half-cycle of the ac supply. The frequency of switching of the suppressor switch means is preferably at least about 100 times that of the ac supply.

The desired waveform might conveniently be sinusoidal or substantially so. For example, the means for sensing deviation may include a comparator having an input in the form of the desired waveform, an input of, or derived from, the ac supply current, and an output of the deviation between the two. The deviation is used to actuate the voltage booster preferably substantially to suppress the harmonic current components in the ac supply.

The actuating means may include a modulator operable to produce an actuating signal for actuating the voltage booster. The modulator may be a pulse width modulator.

The voltage booster may comprise a suppressor switch and flyback diode arranged to charge the dc link capacitor which the suppressor switch is open circuit.

In the case of inductive loads, such as switched reluctance motors, in which only a unidirectional current is required, it is possible according to the invention to minimise the number and/or expense of the additional components required to enable the converter to reduce the amplitude and range of harmonics relative to a fundamental frequency drawn from an alternating current supply.

BRIEF DESCRIPTION OF THE DRAWINGS

Some specific embodiments of the invention will now be described by way of example with reference to the accompanying drawings in which.

DETAILED DESCRIPTION OF THE INVENTION

Figure 1:
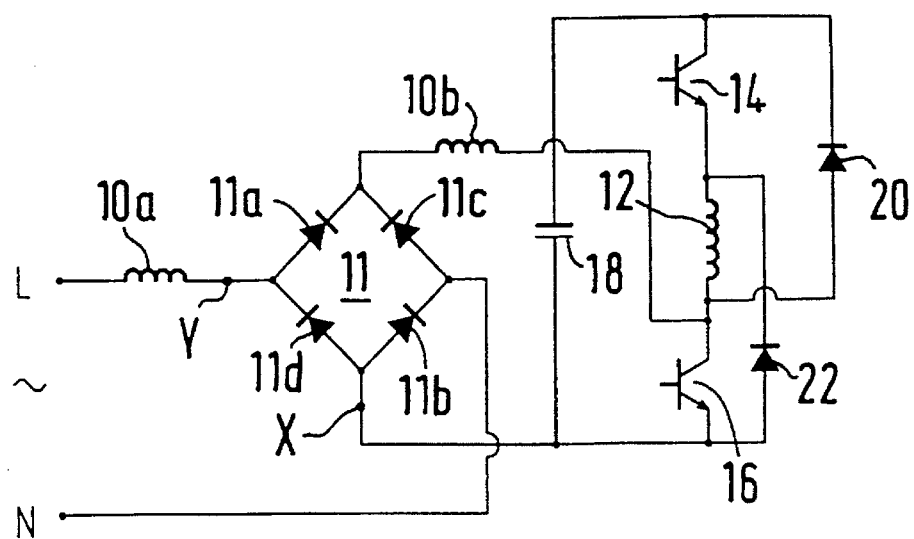
FIG. 1 is a circuit diagram of a first embodiment of the invention for a single phase switched reluctance motor.

The control circuit of FIG. 1 is applicable to a single phase inductive load, such as a switched reluctance (SR) motor. The circuit comprises a pair of alternating current (ac), line and neutral, input terminals L and N respectively. The line terminal L is connected via a first inductance 10a to one ac terminal of a diode bridge rectifier 11 comprising diodes 11a, 11b, 11c and 11d. The single phase winding 12 of the SR motor is connected between the emitter of a control transistor 14 and the collector of a harmonic suppression transistor 16. A smoothing capacitor 18 is connected between the collector of the control transistor 14 and the emitter of the suppression transistor 16. A second inductor 10b is connected from the positive terminal of the bridge rectifier 11 to the collector of the suppression transistor 16, adjacent the winding 12. The inductors 10a and 10b can be used together or as alternatives. The negative terminal of the bridge rectifier is connected with the emitter of the suppression transistor 16. It will be apparent to the skilled person that, as either or both of the inductors 10a and 10b can be used, the purpose is to provide for an inductance at the input before the load and load control means.

A first recirculating diode 20 is connected to conduct from the collector of the suppression transistor 16 to the common point between the collector of the control transistor 14 and the smoothing capacitor 18. A second recirculating diode 22 is connected to conduct from the emitter of the suppression transistor 16 to the emitter of the control transistor 14 adjacent the opposite end of the winding 12.

The suppression transistor 16 and the first diode 20 operate as a booster flyback converter, the switching of which is controlled to maintain the voltage across the capacitor 18 at a relatively constant level which is substantially greater than the peak voltage of the ac supply, for example 1.5×the peak ac supply voltage. The conduction duty cycle of the suppression transistor 16 is modulated during each half cycle of the ac supply to avoid the higher harmonic currents drawn from the ac supply from exceeding the limits on harmonic emissions. The suppression transistor 16 is pulse width modulated at 20–100 kHz in order for it to be inaudible to the human ear. The transistor is, in practice, part of a control subcircuit which monitors the capacitor voltage and adjusts the duty cycle of the pulse width modulating (PWM) control so that the mains supply current has its harmonic current components adequately suppressed, with the major component at supply frequency (eg. 50 or 60 Hz). Of course another supply frequency could be used. The duty cycle of the PWM will vary according to the load, and within each half cycle of the supply voltage. Such control subcircuits are known in the art. An example of one that could be used is the UC 3854 chip manufactured by Unitrode Corporation of the USA.

Whenever the transistors 14 and 16 are conducting together, the voltage across the capacitor 18 is applied to the motor winding 12 in a direction to increase the winding current. The capacitor 18 is thus partially discharged, whereas the current in the inductor 10a and/or 10b increases by virtue of the suppression transistor 16 conducting.

If, while the control transistor 14 is conducting, the suppression transistor 16 is turned off, the current in the inductor 10a and/or 10b is transferred to the first diode 20, thus charging the capacitor 18 and consequently reducing the inductor current relatively rapidly. On the other hand, the current in the motor winding 12 free-wheels through the first diode 20 and the control transistor 14 reducing relatively slowly. The rates of change of the currents depend on the values of the currents and on the inductances including, in the case of a motor winding, the rate of change of inductance (through which the currents are flowing) and on the circuit voltages present in the circuit loops carrying the currents. In the case of the inductor 10a and/or 10b the inductance is small and the circuit voltages include the instantaneous mains voltage (tending to increase the current) and a large voltage across the capacitor 18 (tending to reduce the current). In the case of the SR motor winding, the inductance is larger than that of the inductor 10a and/or 10b and the circuit voltage associated with the loop from the control transistor 14, through the winding 12 and the first diode 20 is relatively small, arising from small voltages associated with the semi-conductor forward drops and winding resistance. Thus, while the transistor 14 is conducting (whether or not the transistor 16 conducts) the average voltage applied to the motor winding 12 is positive, causing motor flux linking that winding to increase.

Whenever the transistors 14 and 16 are both non-conducting together, the current in the inductor 10a and/or 10b reduces relatively quickly, partially charging the capacitor 18. However, the current in the motor winding 12, if present, flows through the diodes 20 and 22 also partially charging the capacitor 18. The motor winding current decays more quickly than when free-wheeling conditions apply through one diode and one conducting transistor.

While the transistor 14 is non-conducting (whether or not the transistor 16 is conducting) the average voltage applied to the motor winding 12 is negative causing flux linking the winding to decrease.

Figure 2:
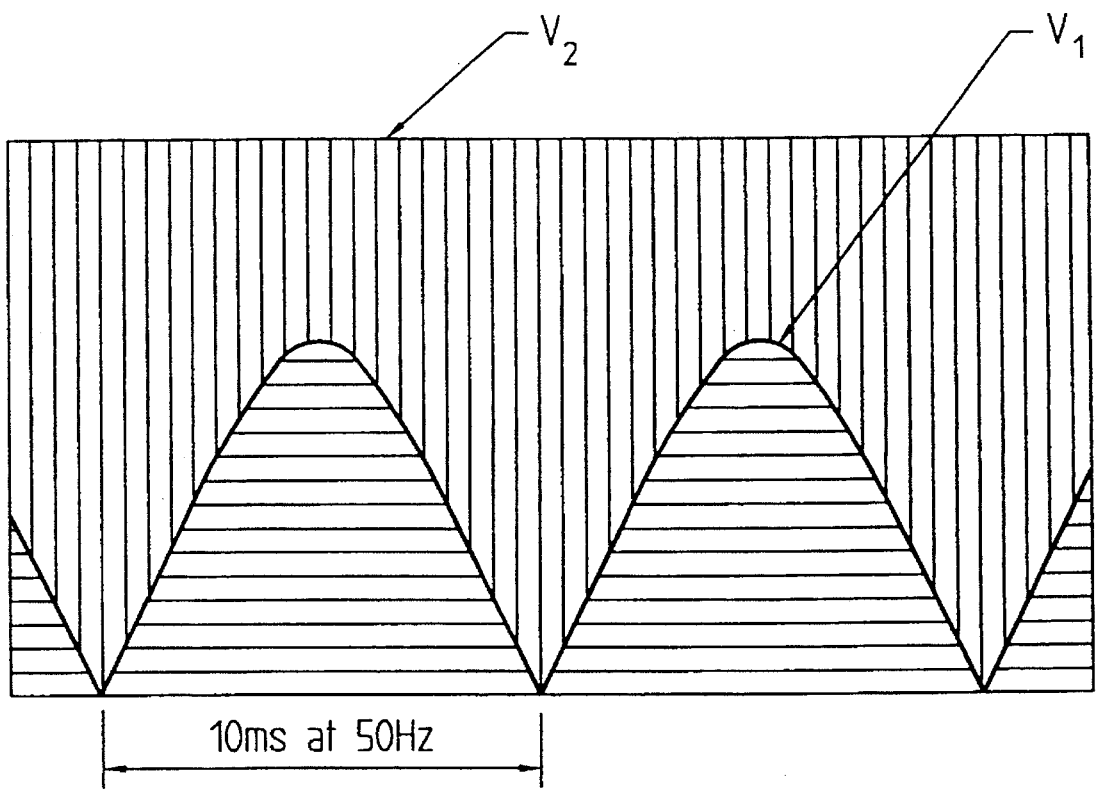
FIG. 2 is an idealized wave diagram illustrating the relative voltages across components in the circuit of FIG. 1.

The ability to control independently the current in the inductor 10a and/or 10b and the current in the winding 12 is illustrated with reference to FIG. 2 which, for simplicity of explanation, assumes that the inductor is limited solely to the inductor 10a. The voltage wave form $V_1$ in FIG. 2 appears across the dc terminals of the bridge rectifier 11. It can be assumed, for the sake of simplicity of explanation, that the inductor 10a is 'ideal', i.e. it possesses no resistance. There can consequently be no direct voltage component appearing across it. Also, since the transistor 16 switches at a frequency usually in excess of 18 kHz, the inductance of the inductor 10a is relatively small, and the component of voltage across it at the frequency of $V_1$ will be very small compared to $V_1$. Thus, the voltage at the frequency of $V_1$ appearing across the transistor 16 will closely resemble $V_1$ of FIG. 2 and this defines the low frequency component of potential at the lower end of the motor winding 12.

It will be understood that the potential across the transistor 16 switches at high frequency between zero when conducting and $V_2$ when non-conducting. Due to the modulation of the duty cycle, the low frequency component of this potential closely resembles the wave form $V_1$ in FIG. 2. The potential of the upper end of the winding 12 takes either of two values, the first being $V_2$, when the transistor 14 is conducting, and the second being zero when the diode 22 conducts. It is thus clear that in FIG. the amplitude of the vertically shaded area is available for the application of a voltage to the winding 12 which will tend to increase winding current, whereas the amplitude of the horizontally shaded area is available for the application of a reverse polarity winding voltage which will reduce winding current.

From the above it will be apparent that the transistor 16 can, by manipulation of its switching duty cycle, control and modulate the current in the inductor 10a and/or 10b irrespective of the conducting or non-conducting behavior of the control transistor 14. In conjunction with the recirculating diode 20, a charging current can be applied to the capacitor 18 whose voltage is maintained thereby at somewhat greater than the peak of the ac supply voltage irrespective of the switching action of the transistor 16. The transistor 14 can, by its conduction, increase motor flux and, by its non-conduction, decrease motor flux thereby providing the necessary control of the winding current for the switched reluctance motor.

Figure 3:
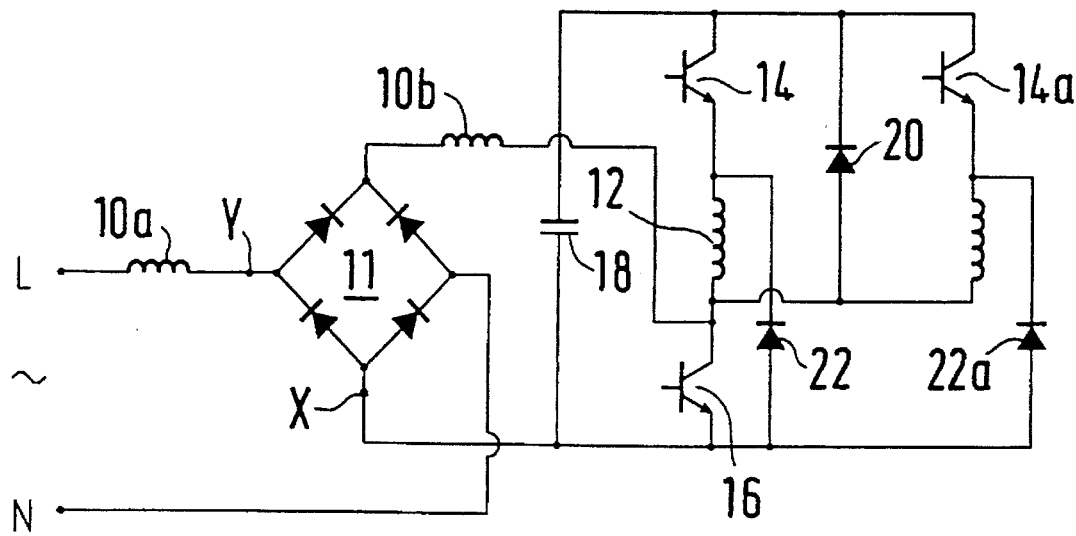
FIG. 3 is a modification of the circuit of FIG. 1 for a polyphase motor.

FIG. 3 illustrates a further embodiment of the invention which is for a two-phase motor. This embodiment of the invention is also applicable to other numbers of phases. Each motor winding 12 and 12a has control transistors 14 and 14a and are commonly connected by their ends remote from the transistors 14 to the suppression transistor 16. A pair of second recirculating diodes 22 and 22a are connected to conduct to the respective ends of the windings adjacent the emitters of the control transistors 14 and 14a. Each control transistor operates independently to control the current pulses in its winding. The single suppression transistor 16 operates as before to reduce the amplitude and extent of the harmonic content of the current drawn from the ac supply.

Figure 4:
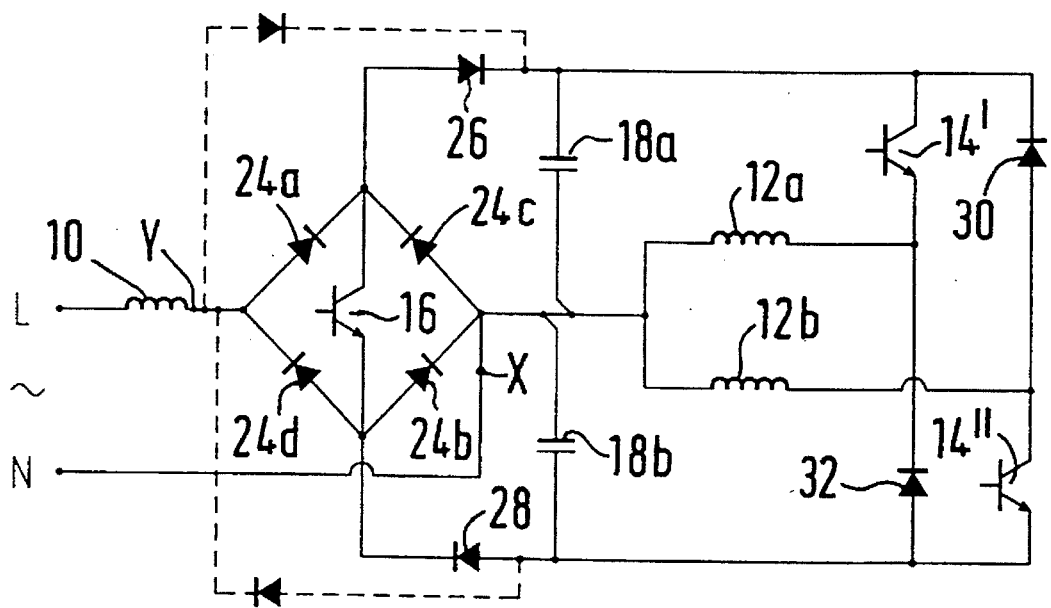
FIG. 4 is a circuit diagram of a further embodiment of the invention and a variant thereon.

FIG. 4 illustrates an alternative circuit according to the invention. Line and neutral ac input terminals L and N are connected to the ac inputs of a diode bridge 24 comprising diodes 24a, 24b, 24c and 24d as before. An inductor 10 is connected between the line terminal L and the diodes 24a and 24d. The neutral terminal N is connected directly between the diodes 24b and 24c. In this embodiment the suppression transistor 16 is connected across the remaining terminals of the bridge so that its collector is connected as a common path from the diodes 24a and 24c and its emitter is connected between the diodes 24b and 24d. A pair of storage capacitors 18a and 18b have a common connection with the neutral ac input terminal N at the connection between the diodes 24c and 24b.

A diode 26 is connected to conduct from between the diodes 24a and 24c, i.e. at the connection with the collector of the suppression transistor 16, to one end of the capacitor 18a. Similarly, a diode 28 is connected to conduct from the other end of the capacitor 18b to the emitter of the transistor 16 between the diodes 24b and 24d. It will be clear from the dotted line in FIG. 4 that the diodes 26 and 28 can alternatively be connected with the line voltage between the inductor 10 and the diodes 24a and 24d. In either position the diodes are exposed to substantially the mains supply voltage if the voltage drops across the diode bridge are discounted. Again, the suppression transistor is shown on its own for the sake clarity although, in practice, it may form part of a control subcircuit, such as the Unitrode UC 3854 manufactured by Unitrode Integrated Circuits Corporation of New Hampshire, USA.

A pair of motor windings 12a and 12b, each representing a phase, are commonly connected, at one end, between the capacitors 18a and 18b. A control transistor 14' has its collector connected between the diode 26 and the positive plate of capacitor 18a and its emitter connected with the one end of a first winding 12a. The diode 28 is connected to conduct to the common connection between the diodes 24b and 24d from the negative plate of the capacitor 18b. The winding 12a, connected with the emitter of the control transistor 14', is also connected to a first recirculating diode 32 which returns winding energy to the capacitor 18b.

A further control transistor 14" has its collector connected with the one end of the winding 12b and its emitter connected with the common connection between the diode 28 and the negative plate of capacitor 18b. A second recirculating diode 30 is connected to conduct from the one end of the winding 12b to the common connection between the collector of the transistor 14" and the positive plate of capacitor 18a.

The inductor 10, the diode bridge 24 and the suppression transistor 16, together with the diode 26, whichever position it is in, work as a boost converter to charge the capacitor 18a to greater than the peak supply voltage and to maintain it at this value for the positive half cycles of the ac supply when the line terminal voltage is greater than that at the neutral terminal. Also, the equivalent boost converter with the diode 28 is arranged to charge the capacitor 18b to greater than the peak supply voltage and to maintain it at this value for the negative half cycles of the ac supply when the line terminal voltage is less than the neutral terminal voltage.

The manner in which this is achieved will be described in detail for the positive half cycles of the ac supply. The skilled person will be aware that a similar consideration applies mutatis mutandis, to the negative half cycles.

The transistor 16 switches ON and OFF many times in each rectified half cycle, the switching frequency being typically in the range 20 kHz to 200 kHz. During each ON period the current through the inductor 10, flowing towards the diode bridge 24, flows via the diode 24a, the transistor 16 and the diode 24b to the neutral terminal N, causing the current in the inductor 10 to increase by an increment $+dI_{10}$. When the transistor 16 turns OFF, the current in the inductor 10 flows via the diode 24a the diode 26 and the storage capacitor 18a to the neutral terminal N. Since the voltage across the capacitor 18a is greater than the peak voltage across the ac terminals, the current in the inductor 10 decreases by a decrement of approximately $-dI_{10}$ during which time the voltage on the capacitor 18a is charged by a smaller increment. Whenever the transistor 16 conducts the diode 26 is reversed biassed and the capacitor receives no charge from the diode 26.

If the diode 26 is connected directly adjacent the inductor 10, the current path while the transistor 16 conducts is unchanged. However, the current path while the transistor is non-conducting includes the inductor 10, the diode 26 and the capacitor 18a to the neutral terminal N.

For the negative half cycles of the supply, when the line terminal voltage is less than the neutral terminal voltage, the current path while the transistor 16 conducts is from the neutral terminal N through the diode 24c, the transistor 16, the diode 24d and the inductor 10 to the line terminal L. While the transistor 16 is non-conducting the path for the current is from the neutral terminal N, through the capacitor 18b, the diode 28, the diode 24d and the inductor 10 to the line terminal L. If the diode 28 is connected directly adjacent the inductor 10, the current path when the transistor 16 is non-conducting is from the neutral terminal N through the capacitor 18b, the diode 28 and the inductor 10 to the line terminal L.

Figure 5:
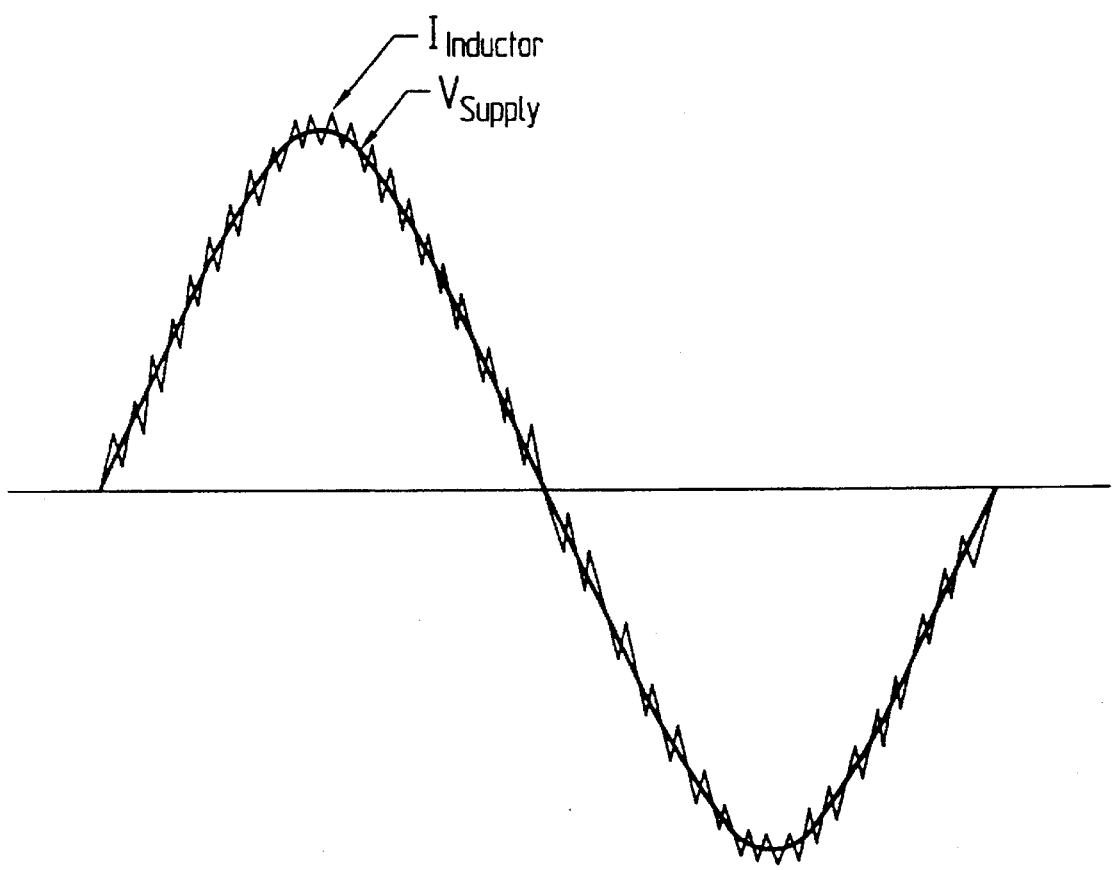
FIG. 5 is a wave diagram associated with the embodiment of FIG. 1, 3 or 4.

By modulating the duty cycle of the transistor 16 in the above embodiments, the increments and decrements of current in the inductor 10 can be made to follow the much lower frequency wave form of the supply voltage as shown in FIG. 5. The current increments and decrements shown in FIG. 5 have relative frequencies, in comparison with the frequency of the supply voltage, that are greatly reduced from that of practical situation for the sake of clarity.

It will be apparent from the foregoing that the actuation of the suppression transistor 16 to control the current drawn from the supply must be based on a comparison of the actual current waveform with a desired waveform which, in this case, is the ac input sinusoid supply in FIG. 5.

Figure 6:
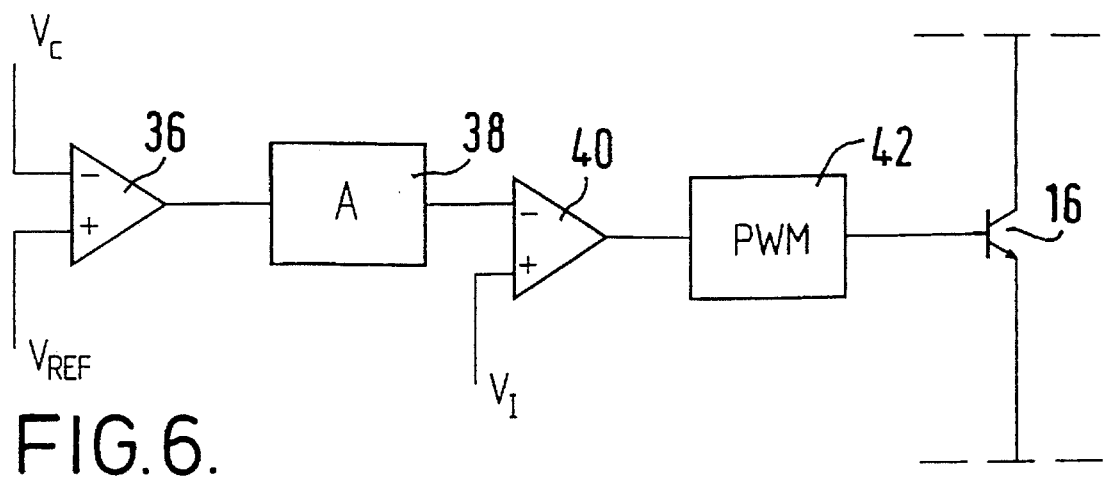
FIG. 6 is a circuit diagram of a harmonic suppressing circuit which maintains a desired current waveform.

FIG. 6 illustrates an arrangement which forms the basis of the UC3854 chip mentioned above. Referring also to FIG. 1 for the purposes of explanation, the voltage $V_c$ across the capacitor, or more likely an input indicative of it, is fed to the inverting input of a comparator 36. The non-inverting input to the comparator 36 is fed with a reference signal Vref that equates to a reference voltage at which it is required to maintain the voltage Vc. The output of the comparator 36 is fed as a control signal to a voltage dependent amplifier 38 which is connected to amplify a signal $V_1$ which is indicative of the supply voltage. The output from the amplifier 38 is fed to the inverting input of a second comparator 40. The non-inverting input is fed with a signal $V_1$ indicative of the supply current. This may be derived from the rectified or unrectified supply, but should be from some point in the circuit before the inductive load 12. For example, a voltage proportional to the rectifier current at the point X between the diodes 11b and 11d could be used. Alternatively, the point Y between the inductor 10a and the rectifier could be used. Equivalent points X and Y are marked on FIGS. 3 and 4. The output of the comparator 40 is a control signal for the suppression switch 16. The actuating signal for the switch 16 is provided by a pulse width modulator 42. Thus, as the capacitor exceeds a desired motor supply voltage, the comparator 36 will produce a reducing output that decreases the gain of the amplifier 38. The overall sinusoidal shape of the waveform of the signal $V_1$ indicative of the supply voltage is maintained, but its amplitude is reduced. The sinusoid is compared with the Signal $V_I$. Any variance between the two signals will result in a non-zero output which influences the duty cycle of the output of the pulse width modulator and, hence, the actuation of the suppression switch 16.

It will be seen that the current waveform is made to track the voltage waveform with significantly reduced harmonics. Furthermore, the circuit of FIG. 6 also maintains the voltage $V_c$ across the capacitor at a correct level by means of the same pulse width modulated suppression switch 16.

The circuit of FIG. 6 is applicable to the embodiments of FIGS. 3 and 4 of the drawings. Concerning FIG. 4, the high frequency ripple present on the current through the inductor 10 can be by-passed through a filter capacitor placed across the line and neutral terminals. This reduces still further the high frequency component of current flowing from the ac supply to an even lower level. The sinusoidal shaping of the current makes it likely that the current harmonics at multiples of the mains frequency can be sufficiently lowered to satisfy legislative requirements.

The duty cycle variation of the transistor 16 in FIG. 4 is adapted to maintain the voltage across each capacitor at a relatively constant desired value somewhat in excess of the peak ac supply voltage. This voltage control function can still be performed even if the load imposed on the two capacitors 18a and 18b by the switched reluctance motor and its switching devices is unequal.

The circuit of FIG. 4 uses, in effect, two half-wave rectifiers of the diode/capacitor pairs 26/18a and 28/18b to charge each the capacitors 18a and 18b. Ignoring, for the sake of clarity, the effect of the voltage drops across the diodes of the bridge 24 and the switching action of transistor 16, all the charging current for the capacitors 18a and 18b would occur at the peak of the ac voltage wave resulting in many relatively strong harmonics. By switching the transistor 16 at high frequency and relying on the inductance of the inductor 10, the ac current can be shaped to be pseudo-sinusoidal as explained above. However, the voltages across the capacitors 18a and 18b must exceed the peak supply voltage so that the boost converter function of the circuit can take place.

If the loading placed on the capacitors 18a and 18b differs due to a very low motor speed, the duty cycles of the transistor 16 for the positive and negative half cycles can be arranged to differ so that the more heavily loaded capacitor can receive more charge. This is a significant benefit for drives which have to operate at low speed for other than a very short time such as acceleration of the motor from rest.

Figure 7:
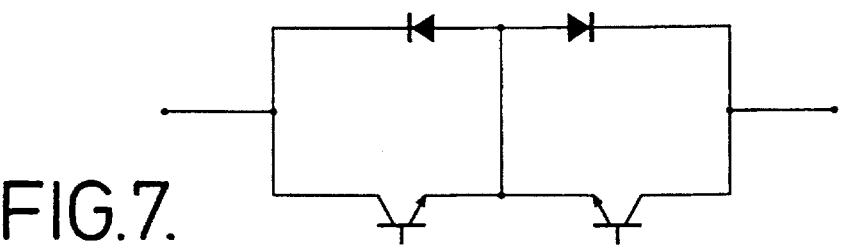
FIGS. 7 and 8 are examples of alternative bi-directional switches which can be used in the embodiment of FIG. 4.
Figure 8:
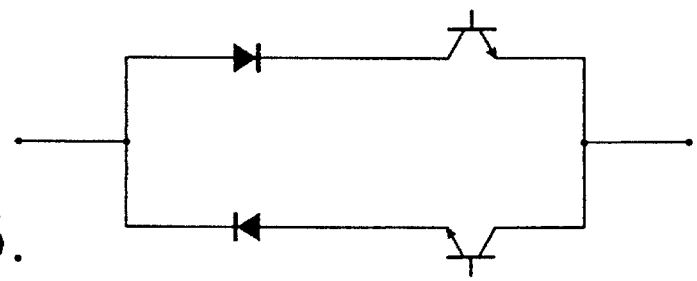

If the diodes 26 and 28 are positioned as shown dotted in FIG. 4, the diode bridge 24 and transistor 16 of FIG. 4 becomes a bidirectional switch operable during both the positive and negative half cycles of the mains current. FIGS. 7 and 8 illustrate other forms of bi-directional switch that could be used. It will be apparent to the skilled person that others exist.

The invention may be considered as a modified boost converter applied to the control of inductive loads.

What is claimed is:

1. A unidirectional current (dc) control system for a switched reluctance machine having a stator defining stator poles, a rotor defining rotor poles and at least one phase winding, the system comprising: a rectifier, having an alternating current (ac) input and a dc output; a dc link capacitor; control switch means arranged to control the current supply to the phase winding from the capacitor; a voltage booster including an inductor arranged in the path of the current from the ac input; suppressor switch means arranged to control the supply of current to the dc link capacitor from the rectifier; sensing means for sensing deviation of the ac input current from a desired waveform and being operable to produce an output indicative of the deviation; and actuating means responsive to the deviation for actuating the voltage booster to compensate for the deviation to maintain the ac input current substantially following the desired waveform to suppress harmonics of the ac input current, and to charge the capacitor to a voltage in excess of a peak value at the ac input to the rectifier.

2. A system as claimed in claim 1 in which the desired waveform is derived from the ac input voltage.

3. A system as claimed in claim 1 or 2 in which the inductor is connected to the input of the rectifier.

4. A system as claimed in claim 1 or 2 in which the inductor is connected to the output of the rectifier.

5. A system as claimed in claim 1 or 2 in which the control switch means are connectable to one end of the phase winding and the suppressor switch means are connectable to the other end of the phase winding, and in which the voltage booster further includes a flyback diode connected to conduct the rectified supply current to the dc link capacitor when the suppressor switch means are open circuit.

6. A system as claimed in claims 1 or 2 in which the actuating means include a modulator operable to produce an actuating signal for actuating the suppressor switch means in response to said deviation.

7. A system as claimed in claim 6 in which the modulator is a pulse width modulator.

8. A system as claimed in claims 1 or 2 in which the sensing means include a comparator arranged to receive a first input derived from the ac input current and a second desired waveform input indicative of the waveform of the ac input voltage.

9. A system as claimed in claim 8, including monitoring means for providing a capacitor signal indicative of the magnitude of the voltage across the dc link capacitor and means responsive to the capacitor signal for adjusting the amplitude of the desired waveform, thereby to maintain the dc link capacitor voltage at a predetermined level.

10. A method of suppressing harmonics in the control of an inductive load supplied from an alternating current (ac) supply using a unidirectional current control circuit comprising: first and second switch means, each switch means having first and second power terminals, the second power terminal of the first switch means being connected with one end of the load and the first power terminal of the second switch means being connected with the other end of the load; unipolarity capacitance means connected across the first power terminal of the first switch means and the second power terminal of the second switch means; first diode means connected to conduct from the first power terminal of the second switch means to the first power terminal of the first switch means; second diode means connected to conduct from the second power terminal of the second switch means to the second power terminal of the first switch means; and a rectifier arrangement having a unidirectional current output and including rectifier means, having ac input terminals and dc output terminals, and an energy storage inductor connected in series with one of the terminals of the rectifier means, the unidirectional current output of the rectifier arrangement being connected across the power terminals of the second switch means, the method comprising:

a) rectifying the ac supply into a unidirectional supply;

b) controlling the supply of current to the load from the capacitance means by actuating the first switch means;

c) charging the capacitance means to a voltage in excess of the peak value of a voltage at the ac input terminals of the rectifier means by actuating the second switch means;

d) comparing the ac supply current waveform with a reference waveform; and e) controlling actuation of the second switch means to suppress the higher harmonic components of the current drawn at the ac input terminals.

11. A method as claimed in claim 10, including controlling actuation of the second switch means by regulating the frequency of the switching.

12. A method as claimed in claim 10 or 11, including controlling actuation of the second switch means by regulating the switching duty cycle to suppress the higher harmonic components of the current drawn at the ac input terminals.

13. A method as claimed in claim 10 or 11, including controlling a supply of current to the load by actuating the first switch means substantially independently of actuation of the second switch means.

14. A method as claimed in claim 10 or 11 in which a signal indicative of the voltage across the capacitance means is compared with a desired reference level and the comparison is used to influence switching of the second switch means to maintain the capacitance means voltage substantially at a desired reference voltage.

15. A unidirectional current control circuit for an inductive load, comprising:

first and second switch means, each switch means having first and second power terminals, the second power terminal of the first switch means being connectable with one end of the load and the first power terminal of the second switch means being connectable with the other end of the load; unipolarity capacitance means connected across the first power terminal of the first switch means and the second power terminal of the second switch means; first diode means connected to conduct from the first power terminal of the second switch means to the first power terminal of the first switch means; and second diode means connected to conduct from the second power terminal of the second switch means to the second power terminal of the first switch means; wherein a rectifier arrangement, having a unidirectional current output and including rectifier means having ac input terminals and dc output terminals and an energy storage inductor connected in the path of the current between the ac input terminals and the dc output terminals of the rectifier means, the unidirectional current output from the rectifier arrangement being connected across the power terminals of the second switch means, the rectifier arrangement, the second switch means and the first diode means forming a boost converter operable to charge the capacitance means to a voltage in excess of the peak value of a voltage at the ac input terminals of the rectifier means.

16. A circuit as claimed in claim 15 in which the rectifier means are a bridge diode rectifier.

17. A circuit as claimed in claim 15 or 16 in which the energy storage inductor is connected between the dc output terminals of the rectifier means and the first power terminal of the second switch means.

18. A circuit as claimed in claim 15 or 16 in which the energy storage inductor is serially connected to one of the ac input terminals of the rectifier means.

* * * * *

UNITED STATES PATENT AND TRADEMARK OFFICE
CERTIFICATE OF CORRECTION

PATENT NO. : 5,563,487
DATED : October 8, 1996
INVENTOR(S) : Rex M. Davis

It is certified that error appears in the above-indentified patent and that said Letters Patent is hereby corrected as shown below:

In column 6, line 4, please delete "lid" and insert therefor --11$d$--.

In column 7, line 52, following "FIG." and before "the" please insert --2--.

Signed and Sealed this

Seventh Day of January, 1997

Attest:

BRUCE LEHMAN

*Attesting Officer*       *Commissioner of Patents and Trademarks*